(No Model.)
G. A. A. SIFFAIT.
COFFEE POT.
No. 246,825.　　　　　　　Patented Sept. 6, 1881.
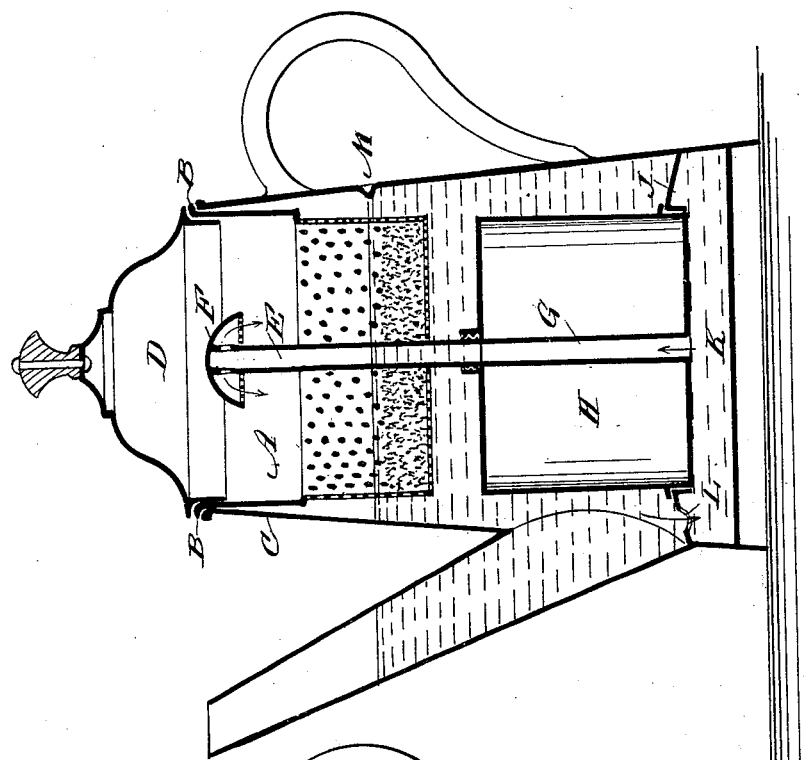
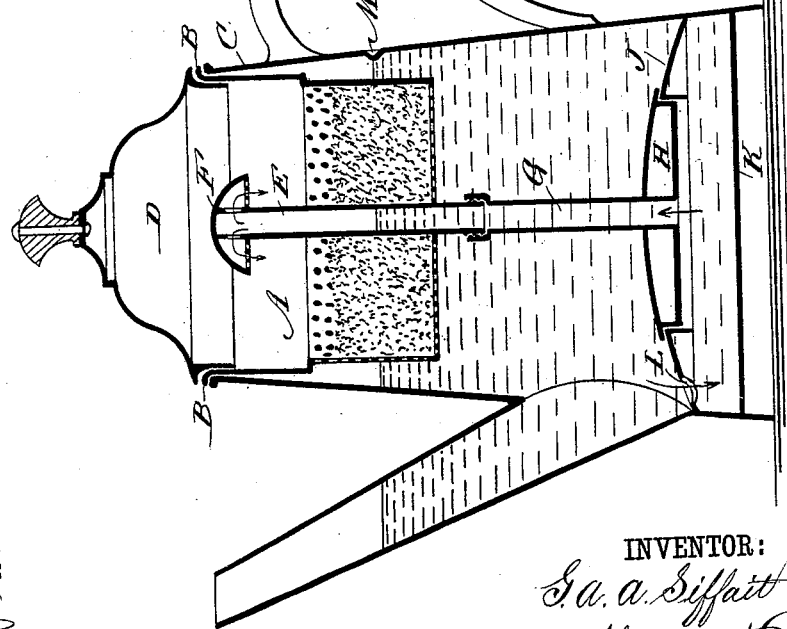
WITNESSES:
C. Neveux
C. Sedgwick
INVENTOR:
G. A. A. Siffait
BY Munn & Co
ATTORNEYS.

UNITED STATES PATENT OFFICE.

GEORGE A. A. SIFFAIT, OF PORTLAND, OREGON.

COFFEE-POT.

SPECIFICATION forming part of Letters Patent No. 246,825, dated September 6, 1881.

Application filed June 25, 1881. (No model.)

*To all whom it may concern:*

Be it known that I, GEORGE A. A. SIFFAIT, of Portland, in the county of Multnomah and State of Oregon, have invented a new and Improved Coffee-Pot, of which the following is a full, clear, and exact description.

The invention consists in a tea or coffee pot provided with cup-shaped sieve, through the bottom of which a central tube passes, surmounted by a perforated cap, and the lower end of this tube is threaded, so that it can be screwed into the upper end of a tube of a filling-piece fitting in and closing an opening in a false bottom or horizontal partition a short distance above the bottom of the pot. This filling-piece is of greater or less size, accordingly as a greater or less quantity of coffee or tea is to be made, as will be more fully described hereinafter.

In the accompanying drawings, Figure 1 is a cross-sectional elevation of my improved coffee-pot provided with a small filling-piece for the false bottom. Fig. 2 is a cross-sectional elevation of the same provided with a larger filling-piece.

The cup-shaped or cylindrical sieve A is provided at its upper edge with an annular external flange, B, resting on the upper edge of the coffee-pot C, and the lid D fits in this sieve A. Tube E passes centrally through the bottom of the sieve A, and has a cap, F, with a perforated under side, mounted on its upper end, a communication being established between the cap and the tube E by means of a series of apertures. The lower end of this tube E is threaded, so that it can be screwed into the upper end of a tube, G, of a filling-piece, H, provided with a projecting edge and fitting in an aperture in a false bottom or horizontal partition, J, a short distance above the bottom K of the pot. This false bottom J is provided with an aperture, L, for establishing a communication between the part of the pot above and that below the false bottom K.

The pot is provided with a projection, m, for indicating the height to which the pot is to be filled with water.

The filling-piece H may be made hollow, of metal, or may consist of a solid block of wood, and may be of various sizes, as shown in the drawings.

The operation is as follows: The filter is removed by unscrewing its tube E from the tube G, and the pot is filled with water up to the mark M. The sieve is replaced, and is then filled with coffee or tea. Care must be taken to press the filling-piece H into the aperture of the false bottom J properly. The pot is then placed over the fire or flame, and the water in the compartment below the false bottom J is converted into steam, which rises through the tubes G and E and is directed on the coffee in the sieve A by the cap F. The water of condensation passes through the tea or coffee in the sieve A and extracts all the aromatic and flavoring extracts. The water can pass from the part above the false bottom J into the compartment below it through the aperture L.

This pot, or a pot constructed like it, can be used to make broth or beef-tea. If a small quantity of tea or coffee is to be made, a large filling-piece H is used, as a small quantity of water will then fill the pot. The filling-piece can be varied in size according to the quantity of tea or coffee desired.

Having thus described my invention, I claim as new and desire to secure by Letters Patent—

1. A pot for making tea or coffee, made, substantially as herein shown and described, with a sieve provided with a central tube screwed to a tube of a filling-piece, for closing an aperture in a false bottom of the pot, as set forth.

2. In a tea or coffee pot, the combination, with the sieve A, provided with a central tube, E, with a cap, F, at the upper end of the filling-piece H, the tube G, and the apertured false bottom J, substantially as herein shown and described, and for the purpose set forth.

GEORGE AUGUSTE ALFRED SIFFAIT.

Witnesses:
EDWARD VERDIR,
PETER ESSER.